US010849459B2

(12) United States Patent
Morgan

(10) Patent No.: US 10,849,459 B2
(45) Date of Patent: Dec. 1, 2020

(54) CHARCOAL GRILL ACCESSORY

(71) Applicant: Graeme K. Morgan, Saugatuck, MI (US)

(72) Inventor: Graeme K. Morgan, Saugatuck, MI (US)

(*) Notice: Subject to any disclaimer, the term of this patent is extended or adjusted under 35 U.S.C. 154(b) by 92 days.

(21) Appl. No.: 15/789,923

(22) Filed: Oct. 20, 2017

(65) Prior Publication Data

US 2018/0132659 A1 May 17, 2018

Related U.S. Application Data

(60) Provisional application No. 62/410,802, filed on Oct. 20, 2016.

(51) Int. Cl.
*A47J 37/07* (2006.01)

(52) U.S. Cl.
CPC ....... *A47J 37/0786* (2013.01); *A47J 37/0704* (2013.01)

(58) Field of Classification Search
CPC .................................................... A47J 37/07
USPC ....................................... 126/25 C, 9 R, 147
See application file for complete search history.

(56) References Cited

U.S. PATENT DOCUMENTS

| | | | | |
|---|---|---|---|---|
| 2,740,395 A * | 4/1956 | Goodwin | ............ | A47J 37/0786 126/148 |
| 2,998,814 A * | 9/1961 | Forsberg | ............. | A47J 37/0786 126/147 |
| 3,060,919 A * | 10/1962 | Shaw | ................... | A47J 37/0786 126/25 C |
| 4,592,334 A * | 6/1986 | Logan, Jr. | ........... | A47J 37/0786 126/25 B |
| 4,777,927 A * | 10/1988 | Stephen | .............. | A47J 37/0704 126/25 R |
| 6,187,359 B1 * | 2/2001 | Zuccarini | ................ | A47J 37/01 126/25 R |
| 2016/0262569 A1 * | 9/2016 | Parrish | ................ | A47J 37/0786 |

* cited by examiner

Primary Examiner — Avinash A Savani
(74) Attorney, Agent, or Firm — Rohm & Monsanto, PLC

(57) ABSTRACT

An accessory for a charcoal grill, particularly a kettle-type grill, that is designed to lay on the surface of the grill's charcoal grate and to partially block convective air flow in the grill while confining charcoal to a small portion of the charcoal grate. The accessory device increases the efficiency of the grill by about 50% as defined by the amount of charcoal required to cook food on the grill. Advantageously, the device keeps lit charcoal from contacting the inside wall of the grill so that no heat is lost by conduction through the wall of the grill and modifies the flow of air in the grill so that the heated air is focused on the food.

13 Claims, 4 Drawing Sheets

TEST WITH DEVICE

TEST WITHOUT DEVICE

CHARCOAL GRILL ACCESSORY

RELATIONSHIP TO OTHER APPLICATION(S)

This application claims the benefit of provisional patent application Ser. No. 62/410,802, filed Oct. 20, 2016, in the name of the inventor herein. The disclosure of the provisional patent application is incorporated herein by reference.

BACKGROUND OF THE INVENTION

Field of the Invention

This invention relates generally to charcoal grill accessory, and more particularly, to a device for conserving the use of charcoal and increasing the efficiency of the grill

Description of the Related Art

Grilling, or barbecuing, is a popular method of preparing food, particularly in the summertime. Many afficionados of grilling generally prefer the taste of food grilled over lit charcoal. However, it is well known that gas grills are more economical to use. For example, if 20 pounds of charcoal costs $10 and gives you about three cookouts, the cost per cookout is about $3.33. A 20 pound propane bottle, that is good for about 25 cookouts, costs about $15, which reduces the cost per cookout to about $0.60. If you were to grill once a week for a year, the cost of using a gas grill would be slightly more than $30 whereas the cost of using a charcoal grill would be about $173. In addition to cost, it takes longer for charcoal to light and to get to cooking temperature. Therefore, efforts have been made to conserve charcoal and to accelerate ignition of the charcoal.

These efforts include the use of the well-known chimney starters to accelerate the burn of the charcoal. Advantageously, the chimney starters obviate the need for an accelerant, such as charcoal lighter fluid. While chimney starters facilitate lighting of the charcoal, they do not conserve the amount of charcoal required for cooking.

Another issue of concern is temperature control in the grill, particularly in the vicinity of the food being cooked. Typically, temperature is controlled by changing the distance between the lit charcoal and the food, such as by raising or lowering either the charcoal grate or the food grill. Of course, the overall temperature in the interior of a grill may also be controlled by simply opening the lid, or by opening vents in the grill body and/or the lid to set-up convection currents.

Another known method for controlling temperature inside the grill is by the use of a non-conductive heat deflector plate. As an example, Kamado Joe, a manufacturer of kamoda-style grills, sells a ceramic heat deflector plate that sits on its tiered cooking grill rack known as the Divide & Conquer Flexible Cooking Rack (trademark of Kamoda Joe, Duluth, Ga.). The deflector plate has a half circle configuration and is said to circulate heat around food placed on the cooking grill for more even cooking. While the ceramic plate may deflect heat from food resting on a cooking grate located above the ceramic plate, it does not significantly modify flow of heated air over the food on the cooking grate, nor does it address the issue of conserving charcoal.

It is, therefore, an object of this invention to provide an accessory for a charcoal grill that conserves the use of charcoal.

It is another object of this invention to provide an accessory for a charcoal grill that improves the efficiency of the grill.

It is also an object of this invention to provide an accessory for a charcoal grill that facilitates better control of temperature in the grill and the improves the application of heated air to the food being cooked on the grill.

SUMMARY OF THE INVENTION

The foregoing and other objects are achieved by this invention which provides a charcoal grill accessory for a charcoal grill of the type having a charcoal grate and a food grate, or grill, in a generally hemispherically-shaped grill bowl, which accessory improves the efficiency of the grill, particularly in terms of charcoal usage, while providing improved temperature control.

The invention is particularly suited to bowl grills, such as the Weber Original Kettle™ charcoal grill (a trademark of Weber-Stephens Products LLC, Palatine, Ill.). Bowl, or kettle, grills have a hemispherically-shaped lower portion, or firebox, for holding the charcoal, typically on a circular charcoal grate that is configured to fit in the firebox. The firebox also includes a circular cooking grate, or grill, held in a position above the charcoal. The cooking grate holds the food, as well as retains heat from the charcoal for searing the food.

This type of grill also includes an upper bowl-shaped portion that may be hinged to the lower portion to form a lid. The lid of a kettle grill is typically fitted with an adjustable damper to control airflow into the grill interior when the lid is closed. The lower bowl-shaped portion has a draft vent through which fresh air is drawn to support combustion of the charcoal. In combination, the damper and draft vents can be selectably opened and closed to aid combustion of the charcoal and to set-up convection currents in the grill to control cooking temperature.

The charcoal grill accessory device of the present invention is configured to fit on top of the circular charcoal grate. Therefore, the charcoal grill accessory has the general overall configuration of a circle of diameter d. Diameter d is slightly less than the diameter of the circular charcoal grate to permit air to circulate freely around the perimeter of the device and to flow along the inside wall of the grill bowl.

The charcoal grill accessory has four distinct portions. The first portion is a flat metallic deflector plate, which is a sheet of metal, such as stainless steel. In preferred embodiments, the stainless steel is an austenitic 304 stainless steel which reflects heat more efficiently than carbon steel. Viewing the accessory device, as a whole, as having the configuration of a circle of diameter d, the flat metallic deflector plate comprises a major segment of the circle. The second portion is an opening in the flat metallic deflector plate that is approximately the minor segment of the circle that complements the aforementioned major segment. The opening receives the charcoal. In combination with the other portions of the charcoal grill accessory of the present invention, the flat deflector plate serves as an air block to force heated air in the grill to travel over the food on the food grate and into the charcoal which is held in the opening.

The opening is defined, in part, by the third portion which is a first vertical strip of metal that is disposed perpendicular to a major face plane of the flat metallic deflector plate. The first vertical strip of metal is affixed to the flat deflector plate so that its bottom edge is coplanar with the lower major face plane of the deflector plate and forms the remainder of the perimeter of the circular grill accessory device. The interior surface of the first vertical strip of metal defines a minor arc of the circle having the angle of approximately x°. The first vertical strip can be made of any conductive metal that is resistant to the effects of the heat in the grill, and is, in preferred embodiments, a 304 stainless steel.

The remainder of the opening is defined by the fourth portion which is a second vertical strip of metal, that may be, in some embodiments, a lip formed by folding the sheet metal comprising the flat deflector plate at the chord that separates the segment comprising the metallic deflector plate portion from the segment comprising the opening. Of course, the second vertical strip of metal is disposed perpendicular to the major face plane of the flat metallic deflector plate. The height of the second vertical strip of metal may be less than the height of the first vertical strip of metal. Nevertheless, it must be sufficient to retain charcoal in the opening, or cut-out portion, of the charcoal grill accessory of the present invention.

In preferred embodiments, the charcoal grill accessory has a diameter (d) of between about 10" and 32" and is configured to fit, as an aftermarket accessory, in standard Weber kettle grills, which have typical food grate diameters ranging between 14" and 37". In a specific embodiment, the accessory device has a diameter of about 17.375" and fits nicely on a Weber Performer brand kettle grill having a 22" diameter.

In practical embodiments, the length of the first vertical strip of metal can range from between about 10" to about 50.25" for Weber kettle grills with a proportionate height ranging from about 2" to 4.5". In the specific illustrative embodiment, wherein the diameter of the circular grill accessory device is 17.375", the length of the first vertical strip of metal is about 12" with a height of 2". The height of the first vertical strip of metal is greater than the height of the second vertical strip. In this specific illustrative embodiment, the height of the second metal strip is 1". However, the height of the second vertical strip can range from about 1" to 2", coequal with the first vertical strip. The first vertical strip not only serves to contain the charcoal in the opening, but reflects heat into the charcoal. Of course, it also serves to guide the convective flow of air along with interior wall of the grill and over the food.

Advantageously, the charcoal grill accessory of the present increases the efficiency of the grill by about 50% as defined by the amount of charcoal required to cook food. For example, if 70 briquettes were typically used, 35 briquettes will now perform the same job, that is, in a practical embodiment 35 briquettes will burn evenly for about two hours and the heat will be concentrated on the food.

BRIEF DESCRIPTION OF THE DRAWING

Comprehension of the invention is facilitated by reading the following detailed description, in conjunction with the annexed drawing, in which.

DETAILED DESCRIPTION

Figure 1:
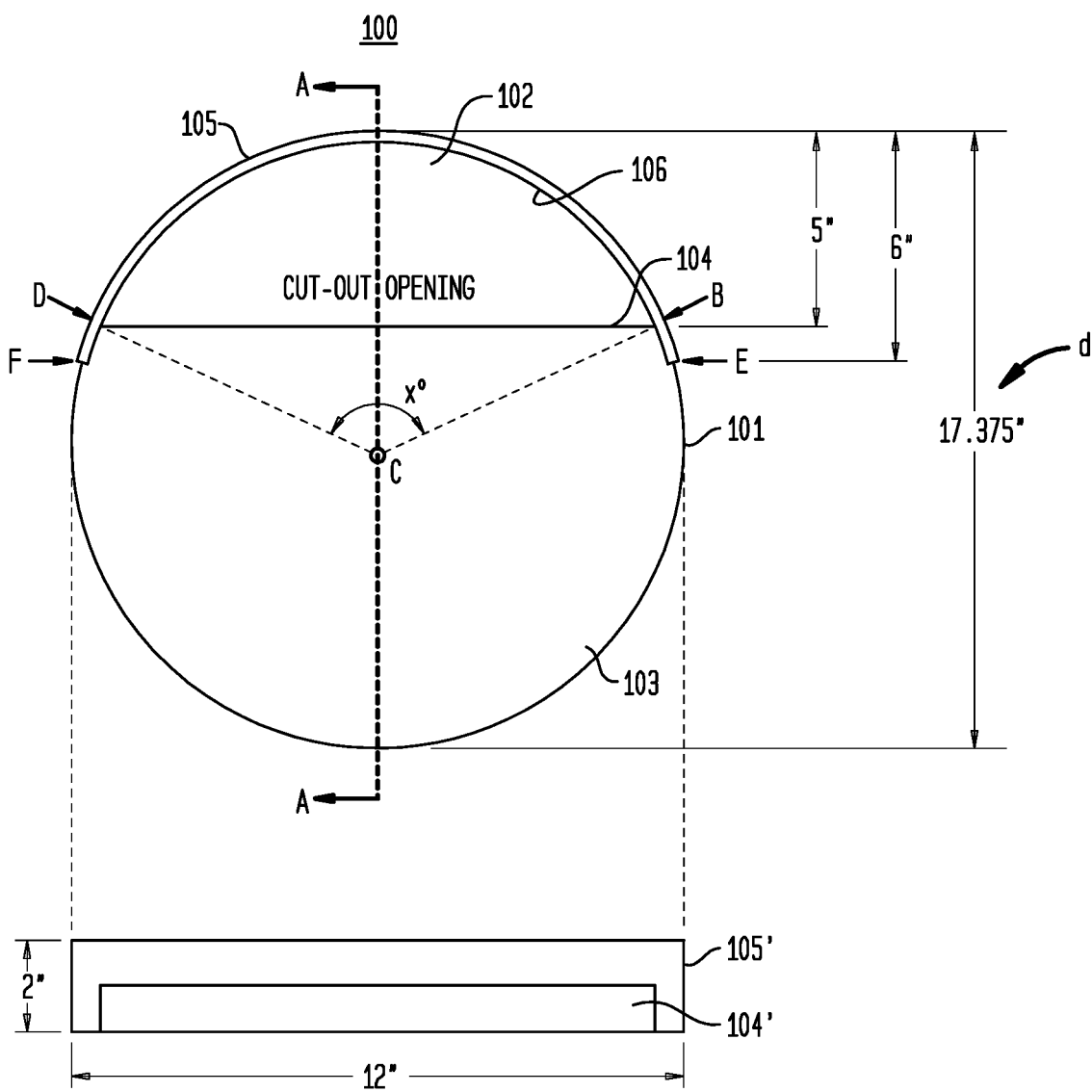
FIG. 1 is a top plan view of a charcoal grill accessory in accordance with the present invention.

FIG. 1 is a top plan view of a charcoal grill accessory in accordance with the present invention which is herein termed an indirect optimizer. Indirect optimizer 100, in this embodiment, has a generally circular configuration with a diameter (d) that is sized to fit on the top surface of the charcoal grate of a kettle-type grill (not shown).

In the specific illustrative embodiment of FIG. 1, the total diameter (d) of indirect optimizer 100 is 17.375". This particular embodiment is configured to fit on a Weber Original Kettle™ Grill having a 22" diameter. All dimensions shown on FIG. 1 are for this particular embodiment. Of course, these dimensions are illustrative only and it would be obvious to a person of ordinary skill in the art that the charcoal grill accessory can be configured to fit on the charcoal grate of any grill in accordance with the principles of the invention.

For reasons that will become apparent from the discussion hereinbelow, the diameter of indirect optimizer 100 is selected to be slightly less than the diameter of the interior of the grill to permit air to circulate freely, illustratively about 0.25" to 0.75" less than the diameter of the grill.

Referring again to FIG. 1, indirect optimizer 100 comprises a flat deflector plate 101 made of sheet metal that has an opening, herein designated cut-out portion 102. Cut-out portion 102 is a minor segment of the circular device and is defined by two vertical strips, or bands, of metal disposed perpendicular to the major face plane 103 of flat deflector plate 101. In use, charcoal is placed into, and retained in, cut-out portion 102 by the vertical strips. Thus, lit charcoal is restrained from contacting the inside wall of the grill by the grill accessory device of the present invention. This prevents loss of heat by conduction of heat through the metallic wall of the grill.

The first vertical strip of metal, herein termed deflector 105, extends along the perimeter of the circular charcoal grill accessory, from point E to point F, forming a minor arc having an angle of approximately x° where it intersects with the chord (B-D) that is formed by the second vertical strip of metal 104. The angle, x°, whose vertex is in the center of the circle (C) and whose rays intersect points B and C can range from about 125° to 180°. In the specific embodiment described herein, angle x° is about 125°. Deflector 105 is affixed to the flat deflector plate 101 in a manner such that its lower edge is coplanar with the bottom of flat deflector plate 101 so that the accessory will lay flat on the surface of a charcoal grate of a grill. Referring to FIG. 1, it is clear that the perimeter of the circular indirect optimizer 100 is defined by the perimeter of flat deflector plate 101 in combination with lower edge of the interior surface 106 of deflector 105.

The second vertical strip of metal, herein termed charcoal separator 104, forms the chord between points B and D on the circular device as shown in FIG. 1. In a practical embodiment, flat deflector plate 101 is bent at a substantially 90° angle at chord B-D and cut to form a lip of the desired height. In the specific embodiment shown in FIG. 1, the height of charcoal separator 104 is 1" and the height of deflector 105, which is typically greater than the height of the charcoal separator 104, is 2". Deflector 105, as measured from points E and F on the circular device of FIG. 1 has a length of about 12". The dimensions presented on FIG. 1 are specific to the illustrative embodiment described herein and are taken along line A-A and derived from a circle with a diameter of 17.375". The inset at the bottom of FIG. 1, shows the relative lengths and vertical heights of the deflector (105') and the separator (104').

Flat deflector plate 101 of indirect optimizer 100 is made of a sheet metal, illustratively stainless steel which conducts heat more efficiently than carbon steel. In a particularly advantageous embodiment, all of the components of indirect optimizer 100 are made of an austenitic 304 stainless steel which is well-known for its heat resistant and heat reflective properties.

Vertical deflector 105, which is made of 304 stainless steel, serves to reflect heat emanating from lit charcoal away from the inside wall of the grill and back into the charcoal retained in cut-out portion 102. As indicated above, the diameter of indirect optimizer 100 is slightly less than the diameter of the interior of the grill bowl. In combination with flat deflector plate 101, deflector 105 (as well as the vertical lip comprising charcoal separator 104) facilitates the production of a convection current of heated air that travels between the inside wall of the grill (not shown in this figure) and the external perimeter of indirect optimizer 100, over the food on the food grate, and back down through the charcoal in cut-out portion 102.

This increases combustion efficiency by producing a more even flow of air through the burning charcoal. Since the heated air goes directly through the charcoal, any change in air flow created by use of the damper vent on the lid, has a more direct effect on the burning charcoal thereby improving temperature control. There is also a better temperature gradient across the cooking surface because there is a very hot area directly over the charcoal in cut-out portion 102 and an even reduction in heat radiation from flat deflector plate 101 with distance from the lit coals as a function of the thermal properties of stainless steel which reflects radiant heat.

In an illustrative method of making embodiment, the various components of the indirect optimizer of the present invention were cut from sheet stock (304 stainless steel with a thickness of 16 to 18 gauge) and cold formed into the appropriate geometric shapes. A portion of flat deflector plate 101 was bent to form the lip comprising charcoal separator 104. The first vertical strip of metal comprising deflector 105 was MIG welded to flat deflector plate 101 to form the configuration shown in FIGS. 1 and 2. However, it would be within the skill of a person of ordinary skill in the art to devise alternate methods of manufacturing the device of the present invention.

Figure 2:
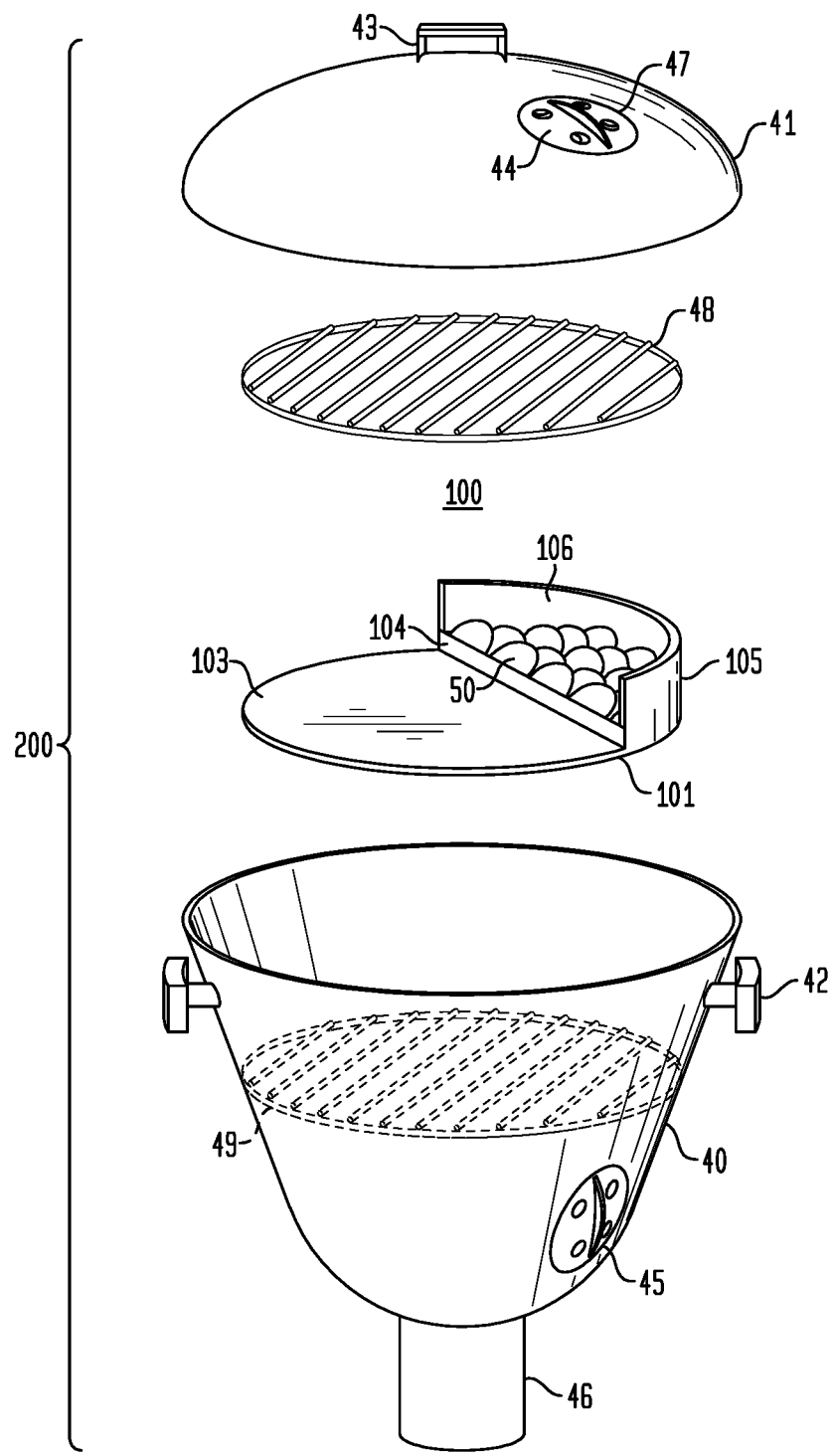
FIG. 2 is an exploded perspective view of a kettle-type grill and a charcoal grill accessory in accordance with the invention.

FIG. 2 is an exploded perspective view of a typical kettle-type grill with indirect optimizer 100 in place. In use, the indirect optimizer of the present invention is placed on the charcoal grate of the grill. Elements of structure that have been previously discussed are similarly designated.

Referring to FIG. 2, grill 200, which has a firebox in the shape of bowl 40 and a conforming bowl-shaped lid 41, is supported in an upright position by stanchion 46. Both the bowl and the lid are provided with handles 42 and 43, respectively. Lid 41 has a damper vent 44 through which heated air and fumes escape when bowl 40 is covered by lid 41. Bowl 40 has a draft vent 45 on the bottom portion through which fresh air is drawn to support combustion during use of the grill. The vents typically comprise multiple openings in the lid and firebox with rotatable covers, such as rotatable cover 47 on vent 44 of lid 41, so that the user can selectably control the size of the openings, if any. The vents control the rate of burn, set-up convection currents, and thus control temperature in the grill. A grate 48 for holding food to be cooked is held in place, illustratively by flanges (not shown), near the top of bowl 40. A second grate 49 is disposed in bowl 40, also illustratively by flanges, for holding charcoal, at a position below food grate 48.

Indirect optimizer 100 is placed on top of charcoal grate 49. Charcoal briquettes 50 are deposited on charcoal grate 49 only in the region of cut-out portion 102 and are retained in position by deflector 105 and charcoal separator 104. The dimensions of cut-out portion 102 limit the amount of charcoal that can be deposited on the grill grate. Advantageously, the amount of charcoal can be reduced by about 50%, e.g., if 70 briquettes are typically used, 35 will perform as well as will be described hereinbelow.

The indirect optimizer 100 of the present invention, focuses the heat on the food being cooked rather than the firebox. In performance tests conducted on a kettle-type grill that has been fitted with the indirect optimizer, the temperature of the exterior surface of the grill, in the vicinity of the charcoal, is about 150° F. cooler than the exterior temperature of a grill without the accessory.

Performance Evaluation

Figure 3:
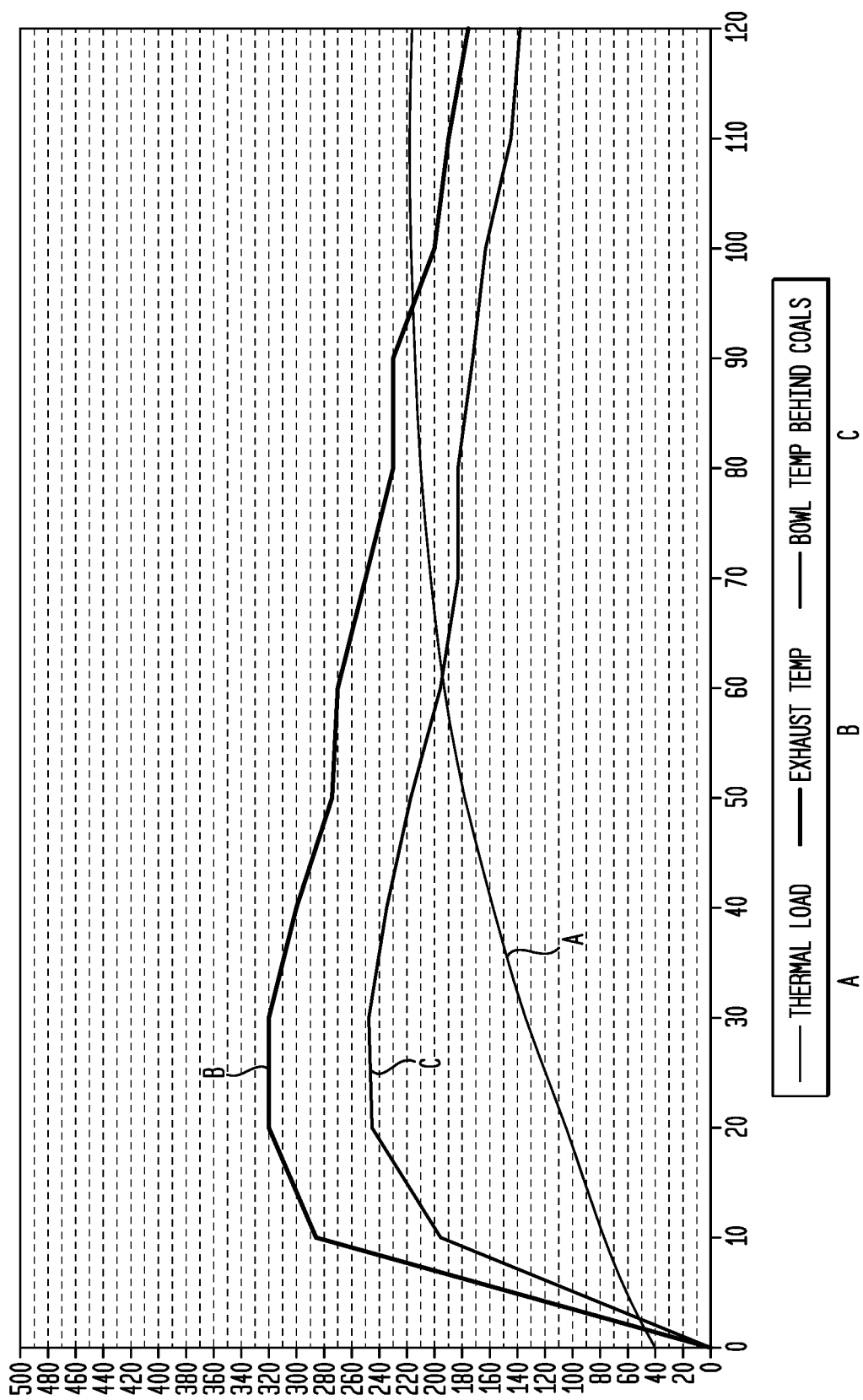
FIG. 3 is a graphical representation of the temperature of a thermal load located on the food grate of a charcoal grill, the exhaust temperature of air taken at the damper vent, and the external wall of the charcoal grill in the vicinity of lit charcoal, in degrees Fahrenheit, as a function of time in minutes on a grill which has been fitted with the charcoal grill accessory of the present invention.

All testing was done using 30 standard charcoal briquettes (e.g., Kingsford brand charcoal) in a kettle grill using 100% bottom draft vent opening and 50% top damper vent opening. An early dump from a charcoal chimney device was used. This means that the charcoal was placed onto charcoal grate when about 50% of the charcoal was lit versus 100%. A thermal load, in the form of a 35 pound block of steel with a thermocouple drilled into the geographic center of the block, was placed in the geographic center of the food grate. The grill lid was placed on the grill with the damper vent on the side opposite to the coals. A digital thermometer was affixed to one of the holes in the damper vent to measure exhaust temperature. The external temperature of the grill was measured by an infrared thermometer attached to the grill bowl in the vicinity of the charcoal. In control firings (without the indirect optimizer accessory), the charcoal was piled against the wall of the grill in the same vicinity as where the coals were held by the accessory. The average ambient temperature during testing without the device (FIG. 4) was about 34° F. and about 29° F. for testing with the device (FIG. 3).

Figure 4:
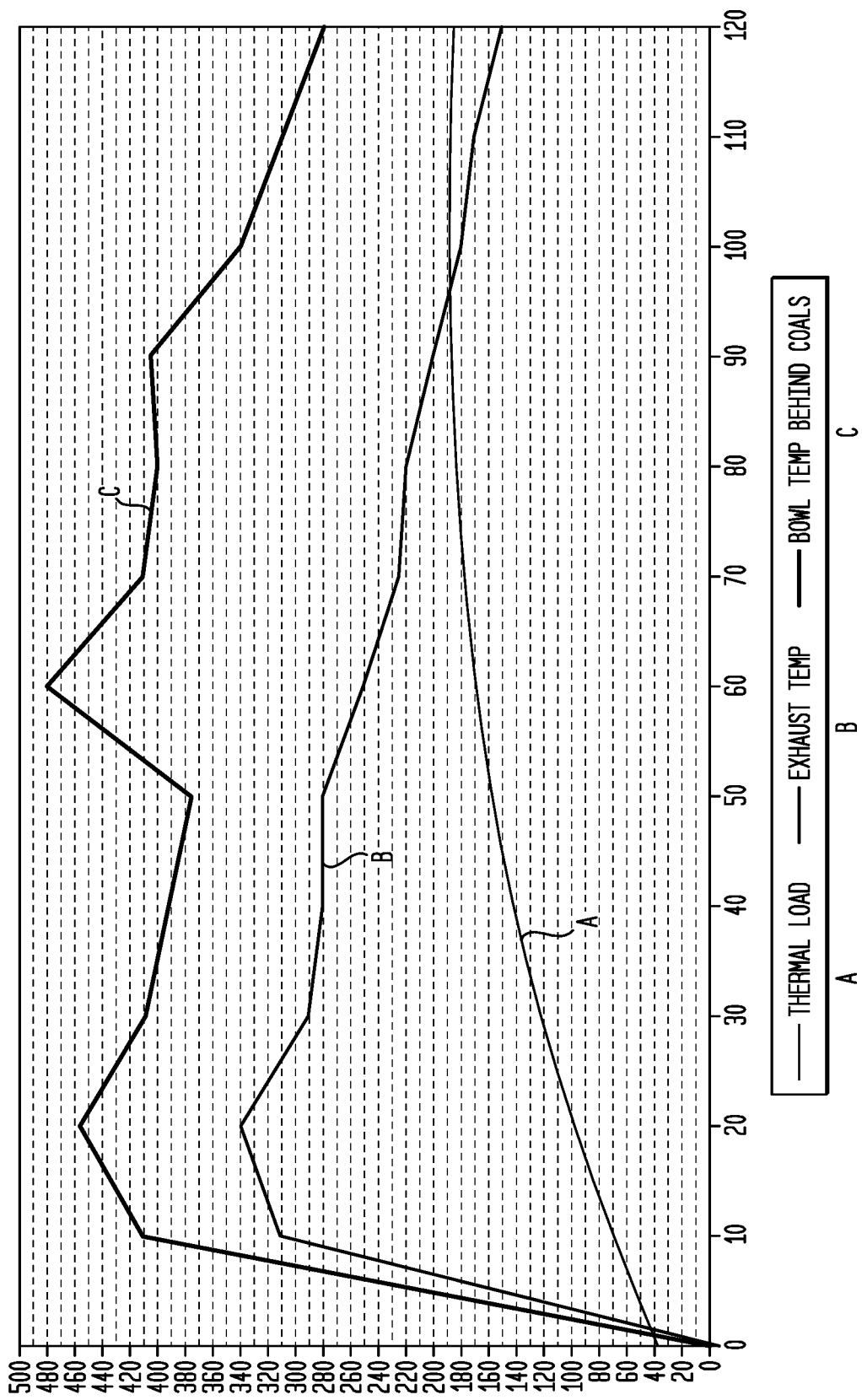
FIG. 4 is a graphical representation of the temperature of a thermal load located on the food grate of a charcoal grill, the exhaust temperature of air taken at the damper vent, and the external wall of the charcoal grill in the vicinity of lit charcoal in degrees Fahrenheit as a function of time in minutes taken as a control.

Readings were taken of temperatures of the thermal load, the exhaust, and the external bowl every 10 minutes for 2 hours. The data points in degrees Fahrenheit (° F.), which are plotted as a function of time (minutes) on FIGS. 3 and 4, were the result of an average of 6 firings with the charcoal grill accessory of the present invention (FIG. 3), and without the device (FIG. 4). A comparison of the data shown on FIG. 3 with the data on FIG. 4 clearly shows that the accessory of the present invention directs more of the available heat from the charcoal burn on the target, that is the food placed on the food grill, and away from the surface of the grill bowl.

Advantageously, the grill is ready to cook in half the time because lighting fewer charcoal briquettes is quicker. Moreover, an early dump technique can be employed, that is, using a chimney starter, the coals can be dumped into the grill when only about 50% are lit, then the lid is closed, and the remainder of the lighting charcoal will heat the grill to cooking temperature. Burning of the charcoal is facilitated by the improved air flow characteristics in the grill with the use of the device.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof. Moreover, the technical effects and technical problems in the specification are exemplary and are not limiting. The embodiments described in the specification may have other technical effects and can solve other technical problems.

What is claimed is:

1. A charcoal grill accessory for a charcoal grill of the type having a generally hem ispherically-shaped grill bowl that supports a circular charcoal grate in the grill bowl and a circular food grate above said charcoal grate, the charcoal grill accessory having the general overall configuration of a circle of diameter d, the charcoal grill accessory comprising: a flat metallic deflector plate comprising heat-resistant and heat-reflective stainless steel configured to fit on top of said circular charcoal grate, the deflector plate being in the form of a major segment of said circle, the diameter d of said circle being slightly less than the diameter of said circular charcoal grate to permit air to circulate freely around the perimeter of the device; an opening in the flat metallic deflector plate for receiving charcoal and preventing the charcoal from contacting the grill bowl, the opening being the minor segment of said circle that complements the major segment; a first vertical strip of metal having an interior surface and an exterior surface, the first vertical strip being disposed perpendicular to a major face plane of the flat metallic deflector plate, the interior surface of the first vertical strip of metal defining a minor arc of said circle having an angle of approximately x° where x° is between about 125 degrees to 180 degrees; and a second vertical strip of metal disposed perpendicular to the major face plane of the flat metallic deflector plate at the chord that separates the segment comprising the metallic deflector plate portion from the opening; the first vertical strip and second vertical strip having different heights.

2. The charcoal grill accessory of claim 1 wherein the diameter of the generally circular device is between about 10" and 32".

3. The charcoal grill accessory device of claim 2 wherein the diameter of the generally circular device is about 17.375".

4. The charcoal grill accessory of claim 1 wherein x° is about 125°.

5. The charcoal grill accessory of claim 1 wherein the length of the first vertical strip of metal is between about 10" to 50.25" and the height is between about 2" to 4.5".

6. The charcoal grill accessory of claim 5 wherein the length of the first vertical strip of metal is about 12" and the height is about 2".

7. The charcoal grill accessory of claim 1 wherein the stainless steel is austenitic 304 stainless steel.

8. The charcoal grill accessory of claim 7 wherein the austenitic 304 stainless steel has a thickness of between about 16 to 18 gauge.

9. A charcoal grill accessory for a charcoal grill of the type having a generally hem ispherically-shaped grill bowl that supports a circular charcoal grate in the grill bowl and a circular food grate above said charcoal grate, the charcoal grill accessory having the general overall configuration of a circle of diameter d, the charcoal grill accessory comprising: a flat metallic deflector plate which is a sheet of austenitic 304 stainless steel configured to fit on top of said circular charcoal grate, the deflector plate being in the form of a major segment of said circle, the diameter d of said circle being slightly less than the diameter of said circular charcoal grate to permit air to circulate freely around the perimeter of the device; an opening in the flat metallic deflector plate for receiving charcoal and preventing the charcoal from contacting the grill bowl, the opening being the minor segment of said circle that complements the major segment; a first vertical strip of metal having an interior surface and an exterior surface, the first vertical strip being disposed perpendicular to a major face plane of the flat metallic deflector plate, the interior surface of the first vertical strip of metal defining a minor arc of said circle having an angle of approximately x where x° is between about 125' to 180°; and a second vertical strip of metal disposed perpendicular to the major face plane of the flat metallic deflector plate at the chord that separates the segment comprising the metallic deflector plate portion from the opening; the first vertical strip and second vertical strip having different heights.

10. The charcoal grill accessory of claim 9 wherein the austenitic 304 stainless steel has a thickness of between about 16 to 18 gauge.

11. The charcoal grill accessory of claim 9 wherein the diameter of the generally circular device is between about 10" and 32".

12. The charcoal grill accessory device of claim 11 wherein the diameter of the generally circular device is about 17.375".

13. The charcoal grill accessory of claim 9 wherein x° is about 125°.

* * * * *